United States Patent
Chandraiah et al.

[11] Patent Number: 6,035,088
[45] Date of Patent: Mar. 7, 2000

[54] METHOD AND APPARATUS FOR ACCESS OF OPTICAL FIBERS IN A RIBBON

[75] Inventors: Vidyananda Bangalore Chandraiah, Lawrenceville; Kenneth Wade Jackson, Snellville; Richard D. Small, Lilburn; Neil Wilbur Sollenberger, Duluth, all of Ga.

[73] Assignee: Lucent Technologies Inc., Murray Hill, N.J.

[21] Appl. No.: 09/154,670

[22] Filed: Sep. 18, 1998

Related U.S. Application Data

[60] Provisional application No. 60/059,641, Sep. 20, 1997.

[51] Int. Cl.$^7$ .......................................... G02B 6/44
[52] U.S. Cl. .......................... 385/114; 156/344; 156/584
[58] Field of Search ........................ 385/100, 114, 385/134, 147; 156/344, 584, 179

[56] References Cited

U.S. PATENT DOCUMENTS

| | | | |
|---|---|---|---|
| 3,920,432 | 11/1975 | Smith | 65/4 |
| 4,147,407 | 4/1979 | Eichenbaum et al. | 385/114 |
| 4,828,349 | 5/1989 | Nakasuji | 385/114 |
| 4,900,126 | 2/1990 | Jackson et al. | 385/114 |
| 5,600,750 | 2/1997 | Beasley, Jr. et al. | 385/114 |
| 5,604,834 | 2/1997 | Beasley, Jr. et al. | 385/114 |
| 5,611,017 | 3/1997 | Lee et al. | 385/114 |
| 5,809,195 | 9/1998 | Brown et al. | 385/114 |

FOREIGN PATENT DOCUMENTS 2 168 230   11/1985   United Kingdom.

*Primary Examiner*—Hemang Sanghavi

[57] ABSTRACT

A method for performing fiber break-out in an optical fiber ribbon, which does not require shutting down the fibers in the ribbon while break-out is being performed, includes the step of placing the ribbon on a smooth surface that is either flat or curved with a radius much greater than the critical bend radius after the matrix material of the ribbon has been softened and swollen. The ribbon is temporarily affixed to the surface, and the softened matrix is then pulled away therefrom. The ribbon is then turned over and temporarily affixed to the surface and the remaining matrix is removed. The fibers that remain are then cleaned with an alcohol solution. In a variation of the method, the matrix is removed by rubbing or abrading it with a textured cloth or pad.

15 Claims, 3 Drawing Sheets

METHOD AND APPARATUS FOR ACCESS OF OPTICAL FIBERS IN A RIBBON

RELATED APPLICATIONS

This application is based upon U.S. provisional patent application Ser. No. 60/059,641; filed Sep. 20, 1997.

FIELD OF INVENTION

This invention relates to accessing optical fibers in an optical fiber ribbon and, more particularly, to accessing fibers in an actively transmitting ribbon.

BACKGROUND OF THE INVENTION

Optical fiber cable development, wherein the cable is capable of multi-channel transmission, has led to the use of bonded arrays of fibers which form a planar ribbon, and to stacks of ribbons within a core tube or sheath. In a typical ribbon array, a plurality of fibers, e.g., twelve, are held in spaced position parallel to each other by a suitable matrix, a configuration which simplifies construction, installation, and maintenance by eliminating the need for handling individual fibers. Thus, the splicing and connecting of the individual fibers can be accomplished by splicing and connecting the much larger ribbons provided that the fiber positions in the ribbon are precisely fixed and maintained.

In the prior art, numerous ribbon arrays have been proposed, all directed at achieving the aforementioned alignment as well as being directed to other aspects of ribbon construction and geometry. Among these is the adhesive sandwich ribbon (ASR) as disclosed in U.S. Pat. No. 4,147,407 of Eichenbaum, et al. and 3,920,432 of Smith. Such ribbon structures have proven to be easy to manufacture, rugged, and compact, and suitable for mass splicing. However, the use of adhesive tapes to form the sandwich necessitates a slow-down in the processing speed during manufacture and in an increased cost of the finished product, as well as the added loss to the fibers.

In U.S. Pat. No. 4,900,126 of Jackson, et al., the disclosure of which is incorporated herein by reference, there is shown a bonded optical fiber ribbon which comprises a coplanar array of longitudinally extending parallel optical fibers in contact with each other. Each fiber is enclosed in inner and outer layers of coating materials and has a color identifier for differentiating each fiber from the other fibers. The inner layer comprises an ultra-violet curable bonding material having a modulus of approximately 1 MPa and an outer layer of an ultra-violet curable bonding material having a modulus of approximately 1 GPa for mechanical protection. With the fibers disposed in a parallel array, interstices are created between the fibers themselves and between the fibers and the envelope of the ribbon, which is a matrix formed of an ultra-violet curable bonding material having a modulus that is less than the modulus of the outer coating layer on the fiber and which is greater than the modulus of the inner coating layer. The matrix material fills the interstices and bonds the fibers together and to the envelope to form a completed ribbon. The modulus of the matrix material and its bond to the color identifier on each fiber are such that interfiber and inter-ribbon movement can occur, and also that accessing of individual fibers is possible. The ribbons may be stacked such that eighteen ribbons, for example, having twelve fibers each, may be enclosed within a core tube to form the core of an optical fiber cable having two hundred and sixteen fibers, or, if preferred, channels. The core tube itself has an outside diameter (O.D.) of approximately 0.6 inches. Such an arrangement, which is in widespread use today, has proved adequate for most present day applications, but it imposes a definite upper limit on the numbers of fibers available and their individual identification and their accessibility.

There is, today, an ever-increasing demand for increased optical fiber cable capacity which is expected to continue into the foreseeable future. Higher fiber count cables and higher fiber packing densities are under constant and ongoing study and development. Extremely high fiber count cables have been proposed that use downsized fiber coating aimed at increasing packing density, however, the long term reliability, engineering, and operational characteristics are not, as yet, fully understood. Hence, an increase in the number of fibers, and, in turn, an increase in packing density, in a standard sized cable and with fibers having the standard thickness of fiber coating, is greatly to be desired. In an article entitled "A Modular Ribbon Design For Increased Packing Density of Fiber Optical Cables" by K. W. Jackson, et al., International Wire & Cable Symposium Proceedings 1993 at pages 20 through 27, the disclosure of which is incorporated herein by reference, there are given the results of a study of the feasibility of increasing the fiber packing density in a high fiber count cable. The cable design concept disclosed therein is based upon a modular structure of the ribbons used in the cable, and it is determined that the packing density for existing cable designs can be increased by as much as thirty to fifty percent. The ribbon structure proposed in that article comprises, for example, an array of sixteen fibers in side by side contacting relationship and divided, as by color coding of the fibers, into two eight fiber modules which, in turn, can be divided into four fiber modules. Each of the ribbons to be stacked within the cable bears, on its surface, identifying alphanumeric numbers. Thus, each fiber within each module in the stack is uniquely identified by two identifiers, i.e., color and ribbon number.

As pointed out in the aforementioned Jackson et al. patent, the color identifier material of each of the fibers should not be removed from the fiber when the bonding material is removed to access the fibers. Thus, the matrix material of the bonded ribbons is selected to have an interfacial bonding characteristic such that the bond interface of the matrix material to the coloring material is weaker than the bonding interface of the coloring material to the outermost coating on the optical fiber. In at least one embodiment of the invention of that patent, a release agent is applied over the coloring material prior to application of the matrix bonding material. There remains a problem, however, in breaking out separate modules from the ribbon, and individual fibers from the module. In general, when it is desired to break out one or more modules from the ribbon, and one or more fibers from the module, a matrix cutting tool is used. Such a tool usually comprises a metallic blade having a cutting edge for slicing through the matrix, however, with such a tool extreme care must be exercised to avoid nicking or otherwise damaging the fiber or fibers adjacent to the cut. Where, as is the case with the ribbon of the aforementioned Jackson et al. patent, the individual fibers are in actual contact with each other, the straight cutting edge of the blade is almost certain to contact the fiber, and avoidance of damage is extremely difficult. This problem is compounded by the fact that most such "breakouts" are performed in the field, under less than ideal conditions, and the installer or splicer is forced to proceed slowly with extreme care. In addition, where, in a sixteen fiber ribbon, for example, the ribbon is divided into four modules of four fibers each, it is quite difficult to identify the line of separation between modules, and to cut along that line.

In breaking out individual fibers, it is desirable that the installer or splicer remove all matrix material from each individual fiber, a process which can consume an inordinate amount of time and is, therefore, economically undesirable.

Heretofore, breakout of fibers from a ribbon has, in most cases, necessitated the deactivation of the fibers to be broken out, whereas it is desirable that the breakout be performed with actively transmitting fibers, thus eliminating down time. However, bit errors can be introduced into an actively transmitting fiber if the access method introduces dB loss that begin to approach the system design margin. The total number of errors introduced will depend upon the magnitude or duration of the induced loss, the bit rate in the fiber, and the system margins. Moreover, with time, the system design margin also tends to be reduced, which further exacerbates the problem. Inadvertent bending of fibers due to handling during reentry of splice points or other re-entry points can cause enough loss for a long enough period of time to cause serious system errors. In a gigabit transmission system, a high loss resulting from fiber bending for only fifty milliseconds could cause the loss of millions of bits. Heretofore, the prior art arrangements and methods of accessing active fibers from the midspan of a ribbon can easily introduce sharp bends into the fibers in the ribbon being accessed, thereby introducing a large number of errors into the transmitted bit stream. A common measure of transmission quality of, for example, the fibers in a fiber ribbon is the bit error rate (BER) which is the probability of incorrect identification of a bit by the receiver apparatus. A BER of $10^{-9}$ is a widely used specification for most commercial systems and corresponds to an average probability of one incorrectly identified bit per one billion bits transmitted. Midspan access methods that generate small fiber bend radii can introduce errors in the bit stream that far exceed the desired BER. Heretofore, in prior art arrangements for accessing the fibers, the methods used to do so rely upon the skill and judgment of the person performing the operation, hence, such techniques are highly unreliable.

SUMMARY OF THE INVENTION

The present invention is a method and apparatus for accessing one or more fibers in an actively transmitting fiber ribbon that substantially eliminates, or at least minimizes the introduction of errors into the transmitted signals.

The optical fiber ribbon may have, for example, twelve optical fibers arrayed in a plane in side-by-side relationship and color coded, as pointed out in the co-pending U.S. patent application Ser. No. 08/788,781 of Brown et al. and as is shown in U.S. Pat. No. 4,900,126 of Jackson et al. A matrix bonding material encases the fibers to form the ribbon. The matrix bonding material is a UV curable bonding material comprising a resin, a diluent, and a photoinitiator. As will be more apparent hereinafter, the surface energies of the color coding inks and the matrix material are such that the adhesion therebetween is not as great as the adhesion of the ink to the fiber coating. As a consequence, the matrix may be separated from the fiber without disturbing the ink coating thereon.

The method of the invention in accessing fibers in a fiber ribbon wherein the fibers are transmitting signals, in a first embodiment thereof comprises the steps of treating the area to be accessed with an ethanol gel or by immersion in ethanol or other suitable agent for a specific time to swell and soften the matrix and to weaken the bond between the matrix material and the ink or dye identifiers on the individual fiber; placing the ribbon so treated on a double-sided adhesion tape on a flat surface; attaching a pulling member, such as a card or a tape, to the matrix material; and peeling the matrix on the one side of the ribbon from the ribbon by pulling it with the card with a slight back tension; turning the ribbon over and placing it on a double sided adhesive tape on the flat surface and peeling the second matrix side therefrom. With suitably low adhesion between the swollen and softened matrix and the colored fibers, a variation of this embodiment involves dispensing with the attaching card or tape and simply pulling the ribbon itself from the adhesive, thereby leaving the matrix attached to the adhesive. The operation is then repeated for the second matrix side. Alternatively, a thin spatula-like member such as a card can be interposed and slid beneath the ribbon to separate it from the underlying attached matrix.

In a second embodiment of the invention, the ribbon area is treated with ethanol as in the first embodiment, and is then laid on the flat surface; the exposed surface of the matrix is then stroked with a textured pad or cloth to remove the matrix; and the ribbon is then turned over and the second matrix side is removed by stroking with the textured pad.

In both embodiments of the invention, the fiber or fibers remain flat and substantially straight throughout, hence, there is negligible bending thereof, either as an involved step, or by accident. Hence, the possibility of an increase in BER is minimized.

Instead of a flat surface, as described in the first embodiment, a convex-curved surface whose radius of curvature is considerably greater than the critical fiber bend radius could be used. A variation of the foregoing would be to hold the ribbon mechanically against the curved surface and remove the matrix from the top surface of the ribbon by using a suitable attaching member such as a tape or other flexible substrate.

In practice, it has been found that a first step in the process of the invention, a pre-wipe of the matrix of the ribbon firmly with textured pad three or four times prior to treating the matrix enhances the rate at which the swelling/softening agent diffuses into the matrix, thereby reducing the time required to access the fibers. This pre-wipe apparently introduces stresses and cracks in the matrix that allow more rapid penetration of the swelling/softening agent therein.

The principles and features of the present invention will be more readily apparent form the following detailed description, read in conjunction with the accompanying drawings.

DETAILED DESCRIPTION

Figure 1:
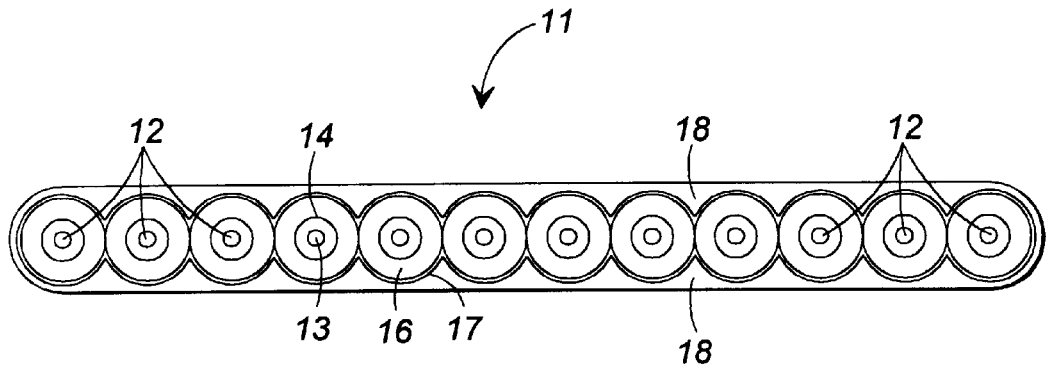
FIG. 1 is a cross-section elevation view of an optical fiber ribbon.

In FIG. 1 there is shown, in cross-section, an optical fiber ribbon 11 having twelve optical fibers 12 arrayed in sideby-side parallel relationship in a single plane. Each of the fibers 12 comprises a core 13 and a cladding 14, a first, inner coating 16 and a second, outer coating 17, and the several fibers 12 are held together in their planar array by a matrix 18. Although not visible in FIG. 1, outer coating or layer 18 has an identifying colored ink thereon for facilitating identification of each of the fibers relative to the others. It is to be understood that instead of first and second layers 16 and 17, each fiber may have only a single layer instead of the two shown, and, further, that layer or coating 17 may have a colorant incorporated therein. It is virtually a necessity that the coloring layer, whatever its make-up, i.e., ink, dye, or colorant incorporation not be removed or otherwise obscured when the matrix 18 is removed to gain access to the fibers. The material of matrix 18 and the surface of the color identifier is selected to have an interfacial bonding characteristic such that the bonding interface between the two materials is weaker than the bonding interface of the ink or colorant to the coating 17 on the fiber, or the coating 16 if coating 17 is not used. Such a desideratum can be achieved, for example, by the application of a release agent, not shown, over the ink or colorant, or by the inclusion of a release agent in the ink or colorant or matrix. The release agent creates a weak boundary layer at the interface of the matrix material and the colorant material. Further, to this end, the surface energy (surface tension) of the ink and matrix materials should be 20–35 mJ/m$^2$. By adjusting the surface energies, a course adjustment can be made to the ink-to-matrix adhesion. A fine adjustment of this adhesion parameter can be made by adjusting the surface cure of the ink. A measure of the surface cure is given by the residual acrylate unsaturation (RAV) of a UV colored fiber, which should be lower than 20%. In practice, it has been found that a range of 2 to 15% works best. A greater RAU leads to increased matrix adhesion.

UV curable matrix bonding material comprises, for example, a mixture comprising a resin, a diluent, and a photoinitiator. The resin may include an aliphatic or aromatic urethane acrylate and/or an epoxy acrylate/methacrylate. The diluent may comprise monofunctional or multifunctional acrylic acid esters having a molecular weight of 100–1000 Dalton. For the photoinitiator, the composition may include ketonic compounds such as 1-hydroxycyclohexyl phenyl ketone, diethoxyacetophenone, acetophenone, benzophenone, benzoin, anthraquinone, and benzil dimethyl ketal. In composition, the bonding matrix may include 50–90 percent weight resin, 5 to 10 percent diluents, and 1 to 10 percent photoinitiator. Additives containing silicon (Si) or fluorine (F) atoms may be added to improve the release properties of the bonding material. A UV curable coloring material (UV ink) is a mixture similar to that of the UV bonding material with the addition of pigments to achieve the desired color.

Figure 2:
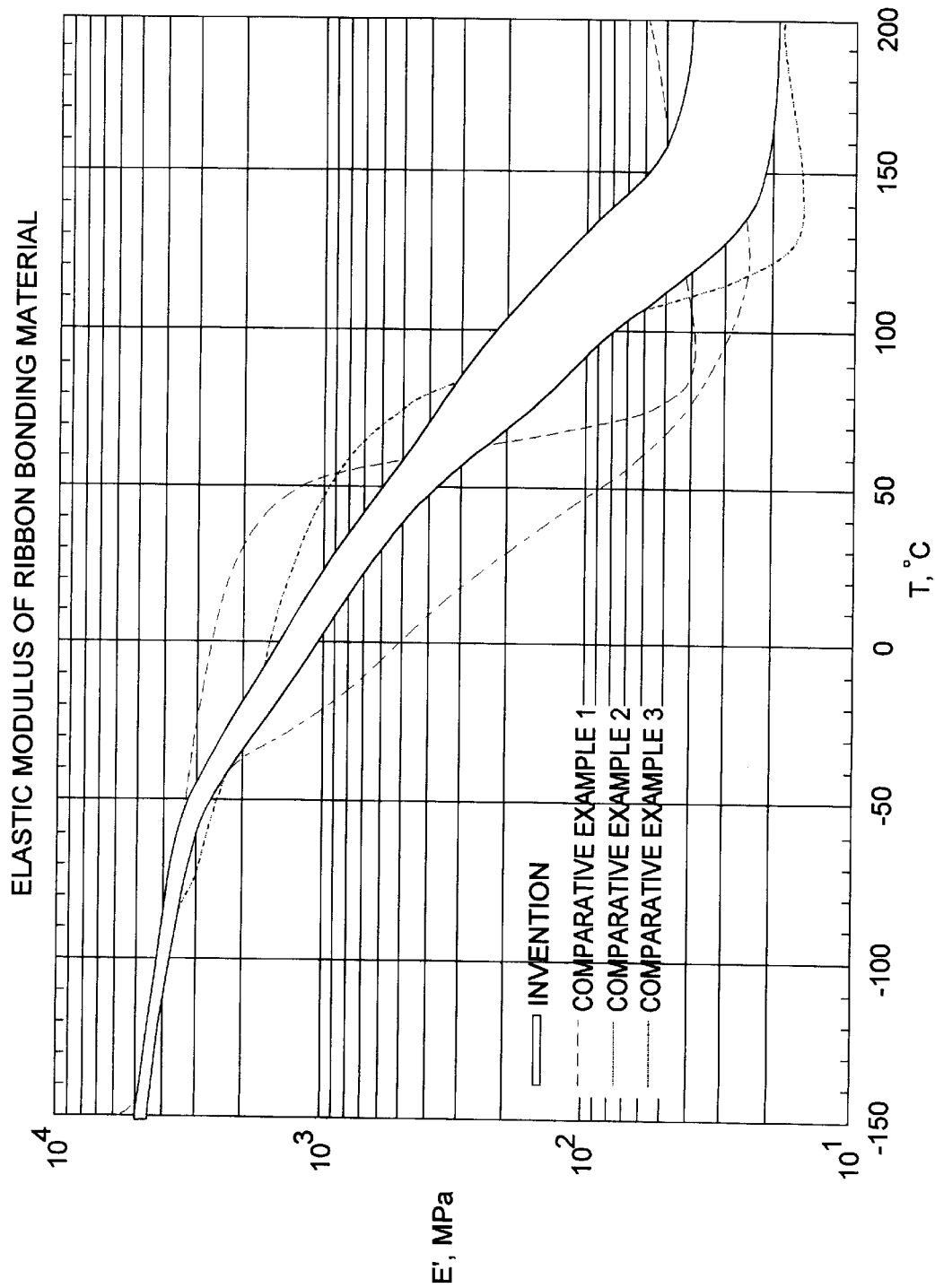
FIG. 2 is a graph of the elastic modulus of the matrix bonding material versus temperature.

Another important property of the matrix bonding material is its modulus as related to temperature. Ideally, the modulus should not change significantly over the expected temperature range of operation, generally considered as −40° F. to 180° F. Where the fiber has a dual coating, layers 16 and 17, inner layer 16 generally has a modulus of about 1 MPa at room temperature and the outer layer has a modulus of approximately 1 GPa at room temperature. The matrix material 18 is a UV curable bonding material which has a modulus greater than 1 MPa, preferably in the range of 600–1200 MPa at room temperature. A higher modulus material may be used when the inner layer 16 comprises a relatively low modulus material. If the modulus is relatively high, thereby insuring sufficient mechanical strength, the release agent insures an easy release between the fiber and the colorant so that the colorant remains with the fiber where the matrix is removed. FIG. 2 is a graph of a desired matrix bonding material elastic modulus versus temperature characteristic (heavy black line) as opposed to the modulus versus temperature characteristic of prior art matrix bonding material.

The present invention is directed to separating the matrix from the array of colored fibers without removal of the colorant while the fibers are transmitting signals, and thus with minimum induced loss.

Figure 3:
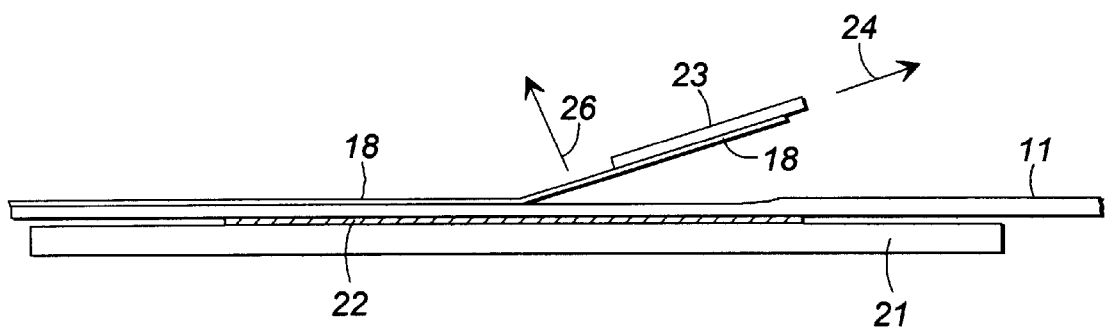
FIG. 3 is a depiction of the process of the invention in a first embodiment thereof.

FIG. 3 depicts the method of achieving the desired separation so that individual fibers may be accessed for splicing or other operations thereon. As shown in FIG. 3, the fiber ribbon 11 which is to be accessed is affixed to a flat (i.e., infinite radius of curvature) plate 21 by means of a double sided adhesive tape 22. Prior to the ribbon 11 being affixed, it can be, although not absolutely necessarily, pre-wiped with a textured pad to introduce stresses and cracks therein and then it is immersed in a softening agent, preferably an ethanol bath, which covers the area in which break-out is to occur. Alternatively, the designated area may be covered with an ethanol gel. The ethanol functions to cause the matrix material to swell and soften, and to weaken the bond between the matrix 18 and the outer coating 17 and its colorant, i.e., ink. As pointed out before, the fiber may have only a single coating layer 16, with the colorant applied thereto or incorporated therein. After the matrix 18 has been softened, which preferably takes less than 10 minutes, a pulling member such as a card, adhesive tape 23, or other flexible member, is affixed to the matrix 18 and the matrix 18 is pulled from one side of ribbon 11 by means of a back tension in the direction of arrow at approximately a 30° angle. This angled back tension has a vertical component as indicated by the arrow 26, which component separates the matrix from one side of the ribbon 11, as shown in FIG. 3. After the matrix 18 has been separated from the ribbon 11 in the desired location, the ribbon is turned over and the process is repeated for the other side of the ribbon 11 or the fibers themselves may be lifted from the matrix that remains attached to the tape. What is then left are the fibers themselves with their coating or coatings 16 and 17 and the colorant intact. The fiber or fibers to be operated on (as by splicing) are then wiped clean of any remnant matrix material, by the use of, for example, reagent grade isopropyl alcohol.

In the process just described, the fibers remain flat/straight at all times and, their transmission of signals during the process is unaffected thereby.

Figure 4:
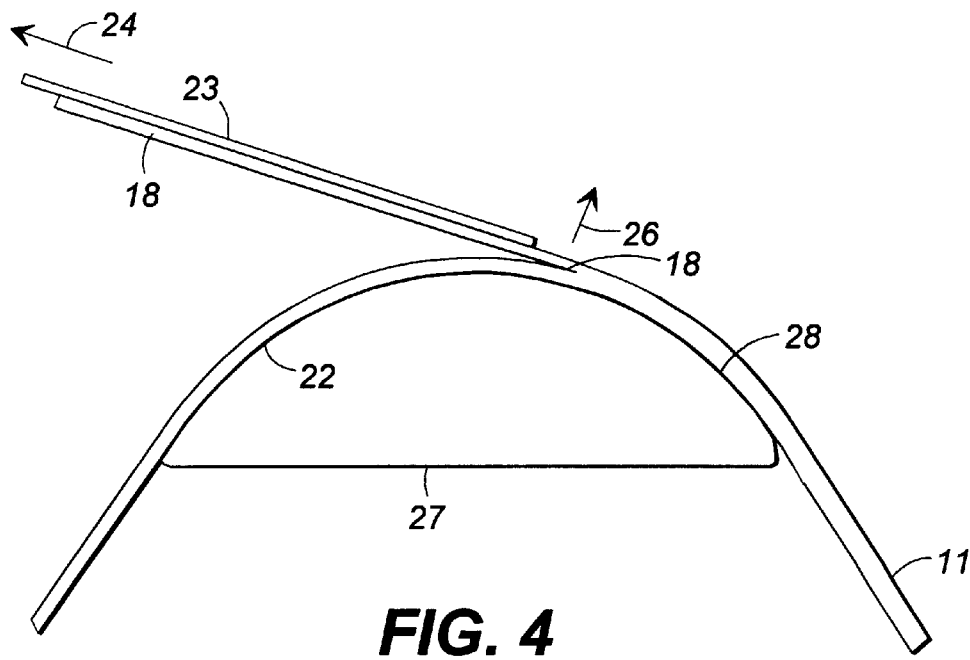
FIG. 4 is a depiction of a variation of the process of FIG. 3 using an especially designed tool or fixture.

In FIG. 4 there is shown a tool 27 that can be carried in the tool kit of the installer, and that presents a smooth curved surface 28 upon which the ribbon 11 is affixed by the double sided tape 22. The main limitation on the surface 28 is that its radius of curvature substantially exceed the critical bend radius of the fibers, thereby preventing the introduction of losses or distortions resulting from too sharp bending of the fibers. In all other respects, the process of the invention is the same as for that shown in FIG. 3.

Figure 5:
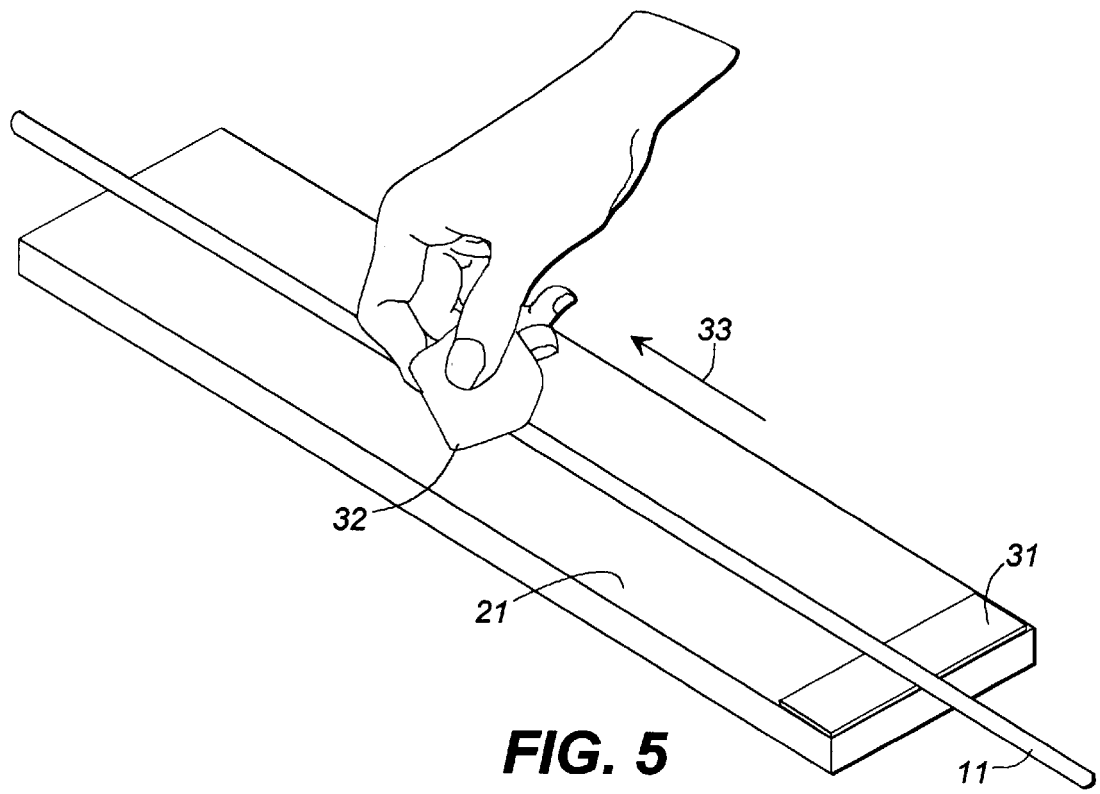
FIG. 5 is a depiction of the process of the invention in a second embodiment thereof.

FIG. 5 illustrates a second preferred embodiment of the process of the invention which, as is the first embodiment of FIGS. 3 and 4, includes the steps of treating the matrix material 18 with ethanol, then laying the ribbon on a smooth flat surface of a flat plate 21. The double-sided adhesive tape 22 of FIG. 3 is not absolutely necessary, although it may be used if desired. Preferably, a small adhesive patch 31 serves to anchor the ribbon 11 to the plate 21. Instead of the matrix 18 being pulled from the ribbon 1 as in the first embodiment, the matrix 18 is removed by being rubbed with a textured cloth or pad 32 in which it is stroked in the direction of the arrow 33. The pad 32 may be, for example, a polyethylene pad which has a textured surface that, in effect, abrades the matrix 18 but is soft enough that it does not abrade the fiber coating 17 nor the colorant layer or coating. It is usually the case that the entire section of the matrix 18 may be removed without the necessity of turning the ribbon over. On the other hand, as an additional assurance that the material 18 may be completely removed, the ribbon 11 may be turned over and the rubbing step repeated. After the rubbing step, the fibers may be cleaned by the use of, for example, reagent grade isopropyl alcohol, which does not affect the colorant.

Figure 6:
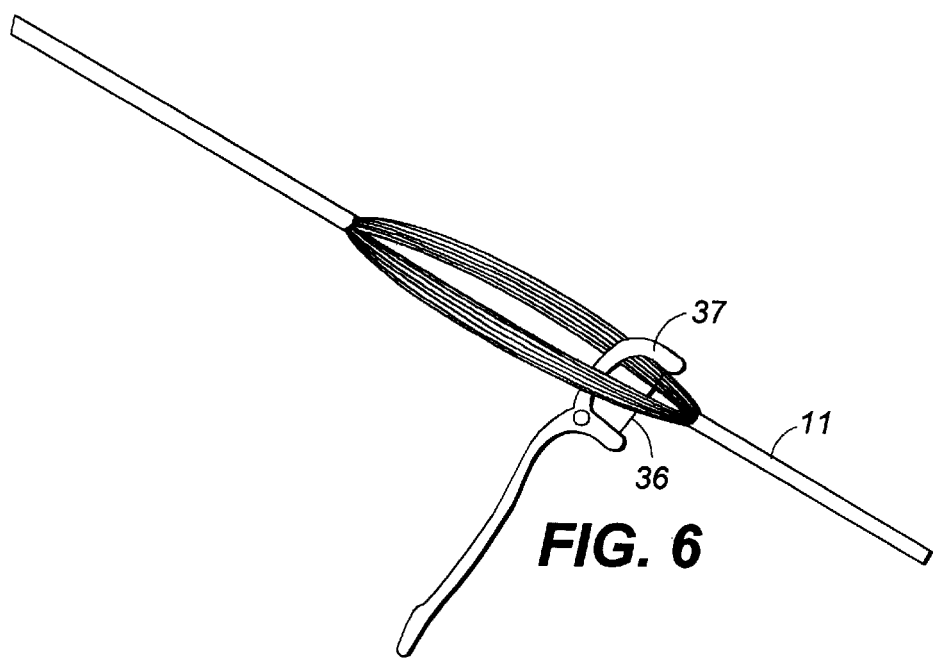
FIG. 6 is a depiction of single fiber/subunit separation using a flexible, cord like member or tool.

In many cases it may be desirable to access only one or two fibers from the ribbon. In that case, any of the foregoing procedures may be used to remove the bonding matrix and thus access all of the fibers in a short portion of the, e.g., approximately 5 cm. Then, as shown in FIG. 6, any desired individual fiber or fibers or integral subunit comprising a plurality of fibers may be separated further along the ribbon 11 by using a thin, flexible cord-like member 36 such as dental floss, held in a tool or holder 37. The member 37 and cord 36 are inserted between the fiber and/or subunit to be separated and moved parallel to the longitudinal dimension of the ribbon 11, thereby freeing the fiber from the bonding matrix 18 without damage thereto or disrupting the mechanical integrity of the adjacent subunits or without inducing bit errors in the actively transmitting fibers or adjacent subunits.

From the foregoing, it can be seen that the method of the present invention makes break-out or individual fiber access in a ribbon fiber possible without introducing losses or signal distortions in the transmitting fibers. It is not necessary to stop signal transmission in performing the break-out, and the break-out, itself, is relatively simple and easy to perform.

In concluding the detailed description, it should be noted that it will be obvious to those skilled in the art that many variations and modifications may be made to the preferred embodiment without substantial departure from the principles of the present invention. All such variations and modifications are intended to be included herein as being within the scope of the present invention. Further, in the claims hereafter, the corresponding structures, materials, and acts and equivalents of all means or step plus function elements are intended to include any structure, material, or acts for performing the functions with other claimed elements or steps as specifically claimed.

We claim:

1. A method for accessing one or more fibers in an optical fiber ribbon having first and second sides and having a plurality of fibers held in parallel relationship by a matrix, said method comprising the steps of:

(a) treating the matrix in the area where break-out of the fiber is desired with a matrix swelling and softening material;
   (b) placing the ribbon on a smooth surface having a radius of curvature materially greater than the critical bend radius of the fiber and temporarily affixing it thereto;
   (c) removing the swollen and softened matrix from one side of the ribbon;
   (d) turning the ribbon over and temporarily affixing it to said surface;
   (e) removing the swollen and softened matrix from the other side of the ribbon.

2. The method as claimed in claim 1 wherein the step of placing the ribbon on a smooth surface comprises placing it on a flat surface.

3. The method as claimed in claim 1 wherein the step of placing the ribbon on a smooth surface comprises placing it on a smooth curved surface.

4. The method as claimed in claim 1 wherein the step of treating the matrix with a matrix swelling and softening material comprises immersing the ribbon in an ethanol bath.

5. The method as claimed in claim 1 wherein the step of treating the matrix comprises covering it with an ethanol gel.

6. The method as claimed in claim 1 wherein the step of removing the swollen and softened matrix from one side of the ribbon comprises pulling the matrix by applying a back tension at an angle to the ribbon to peel the matrix from the ribbon.

7. The method as claimed in claim 6 wherein a pulling member is affixed to the matrix prior to its being peeled off.

8. The method as claimed in claim 6 wherein the step of removing the swollen and softened matrix from the other side of the ribbon comprises pulling the matrix by applying a back tension at an angle to the ribbon to peel the matrix from the other side of the ribbon.

9. The method as claimed in claim 8 wherein a pulling member is affixed to the matrix prior to its being peeled off.

10. The method as claimed in claim 1 wherein the step of removing the swollen and softened matrix from one side of ribbon comprises rubbing the matrix with a compliant member.

11. The method as claimed in claim 10 wherein said compliant member is a textured pad.

12. The method as claimed in claim 11 wherein said textured pad is made of polyethylene.

13. The method as claimed in claim 1 and further including the step of cleaning the fibers.

14. The method as claimed in claim 13 wherein the fibers are cleaned with reagent grade isopropyl alcohol.

15. The method as claimed in claim 1 wherein the matrix is firmly wiped with a textured member prior to the step of treating the matrix with a matrix swelling and softening material.

* * * * *